(No Model.)
J. WAGNER.
APPARATUS FOR WIRING SHEET METAL PANS.
No. 320,020. Patented June 16, 1885.
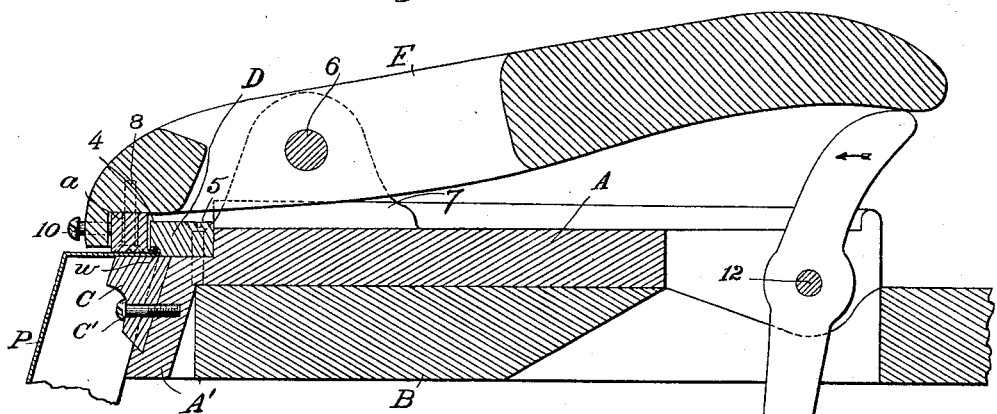
Fig. 1
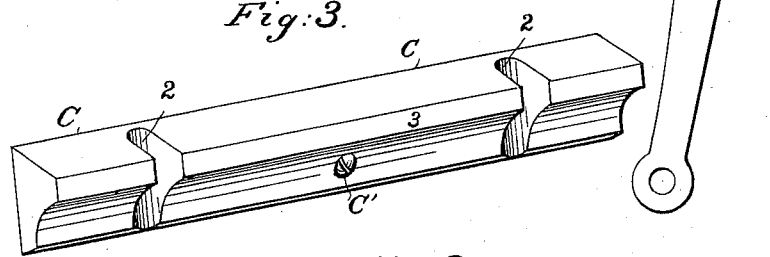
Fig. 3
Fig. 6
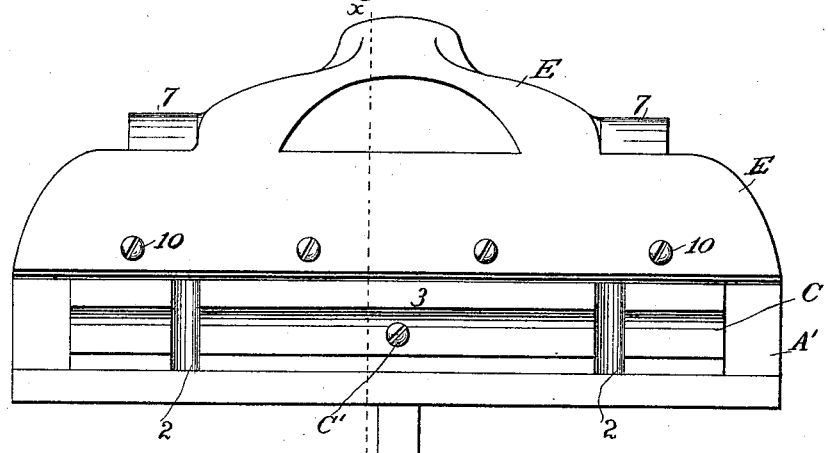
Fig. 2
Fig. 4  Fig. 5
Witnesses,
John F. Nelson
John F. C. Printlet
Inventor,
John Wagner
By Crosby & Gregory, attys

UNITED STATES PATENT OFFICE.

JOHN WAGNER, OF BOSTON, MASSACHUSETTS.

APPARATUS FOR WIRING SHEET-METAL PANS.

SPECIFICATION forming part of Letters Patent No. 320,020, dated June 16, 1885.

Application filed January 12, 1885. (No model.)

*To all whom it may concern:*

Be it known that I, JOHN WAGNER, of Boston, county of Suffolk, and State of Massachusetts, have invented an Improvement in Apparatus for Wiring Sheet-Metal Pans, of which the following description, in connection with the accompanying drawings, is a specification, like letters on the drawings representing like parts.

This invention has for its object the production of an apparatus by which to wire the rims of square or rectangular pans both at the sides and ends thereof.

My invention consists in an apparatus containing the following instrumentalities, viz: A fixed jaw shaped to enter and support the interior of the pan the edges of which are to be wired; a co-operating upper jaw; a jaw-carrier to move it to cause the said jaw to descend upon the flanged edge of the pan below the wire, which is partially or loosely held in the flanged edge of the pan, and a gage having, preferably, an overhanging edge against which the edge of the pan, partially flanged and containing the wire loosely, is placed, substantially as hereinafter particularly set forth and claimed.

Figure 1 is a longitudinal sectional view of an apparatus embodying my invention, the section being in the line $x\,x$, Fig. 3. Fig. 2 is a front elevation of a machine embodying my invention; Fig. 3, a perspective view of of the under jaw detached; Fig. 4, a portion of the pan in the condition in which it is put into the machine, and Fig. 5 a view of the same after the flange is closed about the wire. Fig. 6 is a cross-section of the upper jaw detached from its carrier.

The bed A of my improved apparatus, adapted to be supported on a suitable table or bench, B, has a downwardly-inclined portion, A', which, as shown, is rabbeted to receive the stationary jaw C, which, inserted in the said rabbet, is secured in place by a screw, C'. The under or fixed jaw is of a length from end to end equal to the length of the pan to be rimmed, and to enable the same under or fixed jaw to be used when joining both the sides and ends of a square or rectangular pan, I have slotted the under jaw vertically or at right angles, as at 2 2, the said slots being separated the one from the other for a distance equal in length to the end of the pan to be wired, the edges of the sides of the pan being placed in the slots 2 2 when the ends of the pan are being wired. Pans of different lengths and widths require under jaws of a length equal to the length of the side edge of the pan at top, and to employ the same jaw to wire the ends of the pan the jaw must be slotted so as to leave a part, 3, thereof of a length sufficient to enter and support the end of the pan. The bed has a gage, D, attached to it by screws 5, the said gage being preferably cut or shaped to present at its front an overhanging edge, 4, under which and against a shoulder of the gage the edge of the pan to be wired is placed prior to the descent of the upper jaw, *a*.

E is the carrier for the upper jaw, *a*, and said carrier is pivoted by pin 6 to ears 7 7 rising from the bed A. The jaw *a* has a curved edge or lip, *a'*, (see Fig. 1, but in detail Fig. 6,) arranged next the gage D, and said jaw is adjustably secured to its carrier by screws 8 and 10. The screws 8 extend through transverse slots in the jaw *a* into the carrier E, and when said screws are loosened the screws 10 may be operated to adjust said jaw with relation to the gage. The cam-lever F, pivoted on the bed-plate by pin 12, has its short arm arranged in contact with the long or heavier arm of the jaw-carrier E. Movement of the lever F by means of a treadle and connections joined to the long end of the said lever enables the latter to be turned in the direction of the arrow thereon, and into the position Fig. 1, which actuates the jaw-carrier to close the upper jaw down upon the material or pan under it, as in Fig. 1. The edges of the metal pan to be wired at its sides and ends, usually differing in length, are first partially turned over or flanged, as shown by the letter *d*, Fig. 4, and the wires *w* are then placed loosely in the grooves or spaces formed by the partially-turned edges. The pan having the partially-turned edges provided with wires inserted therein loosely has its side edge placed on the jaw C, and then the jaw-carrier is moved to cause the upper jaw to descend close to but a little behind the wire in the partially-turned edge, so that the lip at the inner edge of the upper jaw by the vibration of the said jaw is caused to move for a short distance in the arc of a circle, which enables the said lip to so act on the flanged part $d$ of the pan under it as to cause the edge of the sheet metal to embrace the wire $w$ closely.

Fig. 1 of the drawings shows a pan, P, in position between the upper and lower jaws, the upper jaw being shown as shut down upon the edge to be wired, leaving it in the condition shown in Fig. 5. The under jaw, C, may be quickly removed and another one of the proper length be substituted for it; and so, also, the gage D may readily be changed for one having a groove at its edge of the proper size to receive the edge of the pan with its wire. The wire in one or more pieces for the edge of the pan is inserted in the partially turned-over edges by hand.

I claim—

1. The combination, with the bed A, of the lower jaw, C, of the length of the longer side of a pan and provided with openings 2, to adapt it to the shorter side of a pan, the upper jaw, $a$, having the lip $a'$, the jaw-carrier E, pivoted to the bed, and means to move it, and a gage, D, secured to the bed, substantially as set forth.

2. The combination, with the bed A, of the lower jaw, C, of the length of the longer side of a pan and provided with openings 2, to adapt it to the shorter side of a pan, the upper jaw, $a$, having the lip $a'$, the jaw-carrier E, pivoted to the bed and provided with screws 8 and 10, for adjustably securing the upper jaw to it, and means to move it, and a gage, D, secured to the bed, substantially as set forth.

In testimony whereof I have signed my name to this specification in the presence of two subscribing witnesses.

JOHN WAGNER.

Witnesses:
G. W. GREGORY,
B. J. NOYES.